US012341244B2

(12) United States Patent
Zhu et al.

(10) Patent No.: US 12,341,244 B2
(45) **Date of Patent: *Jun. 24, 2025**

(54) STRUCTURE FOR UNIFORMLY DISTRIBUTING RADIATION ENERGY OF MILLIMETER WAVE ANTENNA

(71) Applicant: JIANGSU KANGRUI NEW MATERIAL TECHNOLOGY CO., LTD., Jiangyin (CN)

(72) Inventors: Wei Zhu, Jiangyin (CN); Kiuto Leung, Jiangyin (CN); Haolin Chuang, Jiangyin (CN); Chinhui Lin, Jiangyin (CN); Tingting Yang, Jiangyin (CN)

(73) Assignee: Jiangsu Kangrui New Material Technology Co., Ltd., Jiangyin (CN)

( * ) Notice: Subject to any disclaimer, the term of this patent is extended or adjusted under 35 U.S.C. 154(b) by 17 days.

This patent is subject to a terminal disclaimer.

(21) Appl. No.: 17/801,101

(22) PCT Filed: Dec. 10, 2020

(86) PCT No.: PCT/CN2020/135212
§ 371 (c)(1),
(2) Date: Aug. 19, 2022

(87) PCT Pub. No.: WO2022/120702
PCT Pub. Date: Jun. 16, 2022

(65) Prior Publication Data
US 2023/0097181 A1 Mar. 30, 2023

(51) Int. Cl.
*H01Q 13/20* (2006.01)
*H01Q 21/06* (2006.01)

(52) U.S. Cl.
CPC ......... *H01Q 13/206* (2013.01); *H01Q 21/065* (2013.01)

(58) Field of Classification Search
CPC ... H01Q 13/206; H01Q 21/065; H01Q 1/3233
See application file for complete search history.

(56) References Cited

U.S. PATENT DOCUMENTS 5,017,931 A 5/1991 Carlyon
6,317,095 B1 11/2001 Teshirogi et al.
(Continued)

FOREIGN PATENT DOCUMENTS

CN 208444939 U 1/2019
CN 109786941 A 5/2019
(Continued)

OTHER PUBLICATIONS

Hideo Iizuka et al., Millimeter-Wave Microstrip Array Antenna for Automotive Radars, IEICE Trans. Commun., vol. E86-B, No. 9 Sep. 2003, pp. 2728-2738 (Year: 2003).*
(Continued)

*Primary Examiner* — Dieu Hien T Duong
(74) *Attorney, Agent, or Firm* — Zhu Lehnhoff LLP

(57) ABSTRACT

The present invention discloses an structure for uniformly distributing radiation energy of a millimeter wave antenna, comprising an emitting array antenna and/or receiving array antenna including at least one comb-shaped antenna assembly, wherein the comb-shaped antenna assembly comprises a long-strip-shaped antenna body and a micro-strip antenna radiation assembly; one end of the antenna body can be connected with a millimeter wave circuit capable of generating millimeter waves; the micro-strip antenna radiation assembly includes a plurality of middle micro-strip antenna radiation units which are arranged on the middle section of the antenna body at intervals, and a tail-end micro-strip antenna radiation unit which is arranged at the tail end of the antenna body; and the area of the middle micro-strip antenna radiation units is gradually increased from one end close to the millimeter wave circuit to the other end, such that
(Continued)

distribution of energy outwards radiated by each middle micro-strip antenna radiation unit trends to be average.

11 Claims, 5 Drawing Sheets

(56) References Cited

U.S. PATENT DOCUMENTS

| | | | | |
|---|---|---|---|---|
| 8,786,496 | B2 * | 7/2014 | Rida | H01Q 19/021 343/700 MS |
| 12,113,284 | B2 * | 10/2024 | Zhu | H01Q 21/30 |
| 2007/0027930 | A1 | 2/2007 | Alvarado et al. | |
| 2014/0007800 | A1 | 1/2014 | Taylor | |
| 2018/0267139 | A1 | 9/2018 | Park | |
| 2018/0341005 | A1 | 11/2018 | Yoo | |

FOREIGN PATENT DOCUMENTS

| | | | | |
|---|---|---|---|---|
| CN | 210074150 | | 2/2020 | |
| CN | 210074157 | | 2/2020 | |
| CN | 111211405 | A | 5/2020 | |
| EP | 1058339 | A1 | 12/2000 | |
| JP | 2001044752 | A | 2/2001 | |
| JP | 2001111330 | A | 4/2001 | |
| JP | 2009188683 | A * | 8/2009 | H01Q 13/206 |
| JP | 2010161543 | A | 7/2010 | |
| JP | 2011217360 | A | 10/2011 | |
| JP | 2011223050 | A | 11/2011 | |
| JP | 4892498 | B2 | 3/2012 | |
| JP | 2016174291 | A * | 9/2016 | |
| JP | 6470930 | B2 | 2/2019 | |

OTHER PUBLICATIONS

Examination report, issued in Indian counterpart (Indian Application No. 202347023875), dated Nov. 2, 2023.

Supplementary European Search Report, issued in PCT/CN2020135212, dated Mar. 14, 2023.

International Search Report, issued in PCT/CN2020/135212, dated Aug. 31, 2021.

Written Opinion, issued in PCT/CN2020/135212, dated Aug. 31, 2021.

Notice of Reasons for Refusal, issued in Japanese counterpart (Japanese Application No. 2022-577581), dated Nov. 17, 2023.

Notice of Submission of Opinions, issued in Korean Application No. 10-2022-7041461, dated Sep. 26, 2024.

Notice of Submission of Opinions, issued in Korean Application No. 10-2022-7041462, dated Sep. 26, 2024.

* cited by examiner

STRUCTURE FOR UNIFORMLY DISTRIBUTING RADIATION ENERGY OF MILLIMETER WAVE ANTENNA

TECHNICAL FIELD

The present invention relates to a structure for uniformly distributing radiation energy of a millimeter wave antenna, and in particular, to an antenna structure which has better gain and can effectively increase an action distance of millimeter waves.

BACKGROUND ART

With more and more attention to use safety of cars from customers and gradual maturity in development of related technologies, various car anti-collision detecting devices that can detect dynamic conditions (for example, relative positions, relative velocities, relative angles and the like of cars, pedestrians or other obstacles) around the cars to assist driving and prevent collision accidents are widely applied. At present, technical means applied by common anti-collision detecting devices are generally divided into the following types:

Ultrasonic wave: a mechanism that utilizes ultrasonic waves to measure a distance from a car to an object, and utilizes an ultrasonic sensor to send and receive ultrasonic pulse waves through a transducer. The ultrasonic sensor may be calibrated to achieve certain accuracy based on changes of parameters such as temperature, voltage and the like during starting or before reading of a measurement range. However, in use, the ultrasonic waves are difficult to effectively reflect by a fine detected object, and therefore, limitation on application is formed due to the fact that a too small object possibly cannot reflect enough ultrasonic waves to meet detection needs of the ultrasonic sensor.

Infrared ray: based on a light reflection ranging principle, an infrared LED emits light and the other infrared receiving assembly receives and measures strength of infrared light to judge a distance according to the size of the strength. However, an infrared ray ranging angle is small and lack of integrity. The basic principle for detection is utilizing light reflection, as a result, detection results will be severely affected to result in deficiency on application in use on a surface (for example, a dark surface) with poor reflection efficiency.

Laser: a laser beam is emitted by an emitter and time (T1) is recorded; when the laser beam is reflected back after hitting an object, time that a sensor receives returned light is (T2); if propagation speed, in air, of the laser beam is V, a distance between the sensor and a measured object may be calculated as follows: S=V*(T2−T1)/2. However, in use of a laser device, laser light will be reflected back to generate a false signal if the surface of the emitter is adhered with impurities such as water and dust. In addition, measuring precision for laser ranging is poor, which is the defect in use.

Millimeter wave: electromagnetic waves with wavelengths of 1 mm to 10 mm (frequency being 30 GHz to 300 GHz) are utilized to measure time difference between emitting and receiving to calculate a distance; for long-distance detection for cars, a 77 GHZ millimeter wave frequency band is preferable; however, the millimeter wave frequency band applied to a car-surrounding radar is approximately 24 GHz, and therefore, the millimeter wave is most suitable for being applied to long-distance detection without influences of an environmental climate because of the longest wavelength of the millimeter wave.

An antenna structure which is conventionally applied to a millimeter wave device to emit or receive the millimeter wave is as shown in FIG. 1, and the structure of a millimeter wave antenna B is may be directly etched on the circuit board C, including: an emitting array antenna B1 including a plurality of comb-shaped antenna assemblies 2 and a receiving array antenna B2; in an embodiment as shown in FIG. 1, the emitting array antenna B1 includes three comb-shaped antenna assemblies 2, and the receiving array antenna B2 includes four comb-shaped antenna assemblies 2 (the comb-shaped antenna assemblies 2 at the two sides of the receiving array antenna B2 are used for isolating without guiding in the millimeter waves). In practical use, the number of the comb-shaped antenna assemblies 2 may be respectively adjusted according to the emitting strength and the receiving sensitivity of the millimeter waves to meet different needs.

The conventional comb-shaped antenna assembly 2 is mainly formed by cascading a plurality of micro-strip antenna radiation units 22, which are of rectangular (square) structures with fixed sizes, and are positively arranged on one strip-shaped antenna body 21 at equal distance to form a comb-shaped antenna assembly 2 including a cascading feeding-in framework. If the comb-shaped antenna assembly 2 with the cascading feeding-in framework is applied to a state of emitting the millimeter wave by the emitting array antenna B1, the energy of the millimeter waves output from a default millimeter wave circuit C1 on the circuit board C is firstly fed in from a head end (one end close to the millimeter wave circuit C1) of the comb-shaped antenna assembly 2, and is partially radiated outwards through a first micro-strip antenna radiation unit 22 (closest to the millimeter wave circuit C1); and the rest of the energy is continuously fed to the tail end (one end away from the millimeter wave circuit C1) along the antenna body 21 and is respectively radiated outwards partially through each middle micro-strip antenna radiation unit 22 (a small part of the energy is lost in a transmission process) until one micro-strip antenna radiation unit 22 at the tail end completely radiates the rest of the energy.

It can be known from the above that energy which is outwards radiated through each micro-strip antenna radiation unit 22 in the comb-shaped antenna assembly 2 is different in a process that the millimeter wave energy is outwards emitted through the comb-shaped antenna assembly 2. Each micro-strip antenna radiation unit 22 in the comb-shaped antenna assembly 2 has the same area, shape and arrangement way when the size of the area of each micro-strip antenna radiation unit 22 is in direct proportion to the efficiency of the outwards radiated energy. As a result, in practical application, the micro-strip antenna radiation unit 22 closet to the millimeter wave circuit C1 will radiate more energy and bear greater load when the millimeter waves output from the millimeter wave circuit C1 are guided into the antenna body 21, and the micro-strip antenna radiation unit 22 away from the millimeter wave circuit C1 will gradually radiate less energy and bear smaller load when the millimeter wave energy is gradually attenuated after being gradually radiated outwards through the micro-strip antenna radiation unit 22. In such a manner, a state that radiation energy distribution of each micro-strip antenna radiation unit 22 is uneven will severely affect integral energy outward radiation efficiency of the comb-shaped antenna assembly 2.

Otherwise, the comb-shaped antenna assembly 2 will receive and sense uneven radiation energy distribution if applied to a state of receiving the millimeter waves through the receiving array antenna B2.

In view of the defects of the millimeter wave antenna structure, the inventor still makes improvement to the defects, and thus, the present invention is disclosed.

SUMMARY OF THE INVENTION

The present invention mainly aims to provide an structure for uniformly distributing radiation energy of a millimeter wave antenna, including at least one comb-shaped antenna assembly which is provided with a long-strip-shaped antenna body and a micro-strip antenna radiation assembly arranged on the antenna body; one end of the antenna body can be connected with a millimeter wave circuit capable of generating millimeter waves; the micro-strip antenna radiation assembly includes a plurality of middle micro-strip antenna radiation units which are arranged on the middle section of the antenna body at intervals, and a tail-end micro-strip antenna radiation unit which is arranged at one end of the antenna body away from the millimeter wave circuit; the middle micro-strip antenna radiation units respectively have areas of different sizes. In addition, the arrangement way of the areas with different sizes is that the areas are gradually increased from the middle micro-strip antenna radiation unit close to one end of the millimeter wave circuit to the middle micro-strip antenna radiation unit at the other end. In such a manner, radiation energy of each middle micro-strip antenna radiation unit trends to be an average distribution state, so that integral gain of the comb-shaped antenna assembly can be improved.

Another object of the present invention is to provide a structure for uniformly distributing radiation energy of a millimeter wave antenna. Each middle micro-strip antenna radiation unit is in the shape of a rectangle with a length-to-width ratio of (1.2-1.3) to 1, such that a point of resonance of the middle micro-strip antenna radiation unit can be kept at a place close to 76.5 GHz. Two adjacent middle micro-strip antenna radiation units with gradually increased areas are within a size proportion range of (1.1-1.2) to 1, such that the millimeter wave energy can be outwards radiated with higher efficiency.

Another object of the present invention is to provide a structure for uniformly distributing radiation energy of a millimeter wave antenna, wherein each middle micro-strip antenna radiation unit and the tail-end micro-strip antenna radiation unit are respectively arranged on the antenna body at a skew angle at intervals, such that opposite-direction interference can be reduced. In addition, a part connecting the tail-end micro-strip antenna radiation unit to the antenna body is provided with a rectangular concave notch, such that the number of reflections of the tail-end micro-strip antenna radiation unit can be reduced.

To achieve the object and the effects, the present invention adopts the following technical means that the uniform distributing structure includes at least one comb-shaped antenna assembly which is provided with a long-strip-shaped antenna body and a micro-strip antenna radiation assembly arranged on the antenna body; one end of the antenna body can be connected with a millimeter wave circuit capable of generating millimeter waves; the micro-strip antenna radiation assembly includes a plurality of middle micro-strip antenna radiation units which are arranged on the middle section of the antenna body at intervals, and a tail-end micro-strip antenna radiation unit which is arranged at one end of the antenna body away from the millimeter wave circuit; the area of the middle micro-strip antenna radiation unit at one end of the antenna body away from the millimeter wave circuit is not smaller than the area of the middle micro-strip antenna radiation unit at one end close to the millimeter wave circuit.

Based on the structure, the arrangement way of the middle micro-strip antenna radiation units is that the area of the middle micro-strip antenna radiation unit closer to the millimeter wave circuit is smaller than the area of the middle micro-strip antenna radiation unit away from the millimeter wave circuit.

Based on the structure, at least partially adjacent middle micro-strip antenna radiation units have the same area.

Based on the structure, the shape of each middle micro-strip antenna radiation unit and the tail-end micro-strip antenna radiation unit can be selected from one of a rectangle, a polygon, an ellipse and the like.

Based on the structure, the middle micro-strip antenna radiation units are in the shape of a rectangle with a length-to-width ratio of (1.2-1.3) to 1.

Based on the structure, the adjacent two middle micro-strip antenna radiation units with gradually increased areas are in an area proportion of (1.1-1.2) to 1.

Based on the structure, the tail-end micro-strip antenna radiation unit is in the shape of a square.

Based on the structure, a part connecting the tail-end micro-strip antenna radiation unit to the antenna body is provided with a rectangular concave notch.

Based on the structure, each middle micro-strip antenna radiation unit and the tail-end micro-strip antenna radiation unit are arranged on the antenna body in the same direction at a skew angle at intervals.

Based on the structure, each middle micro-strip antenna radiation unit and the tail-end micro-strip antenna radiation unit respectively form skew angles of 45 degrees with the antenna body.

Based on the structure, one corner of each middle micro-strip antenna radiation unit is linked to the antenna body.

Figure 1:
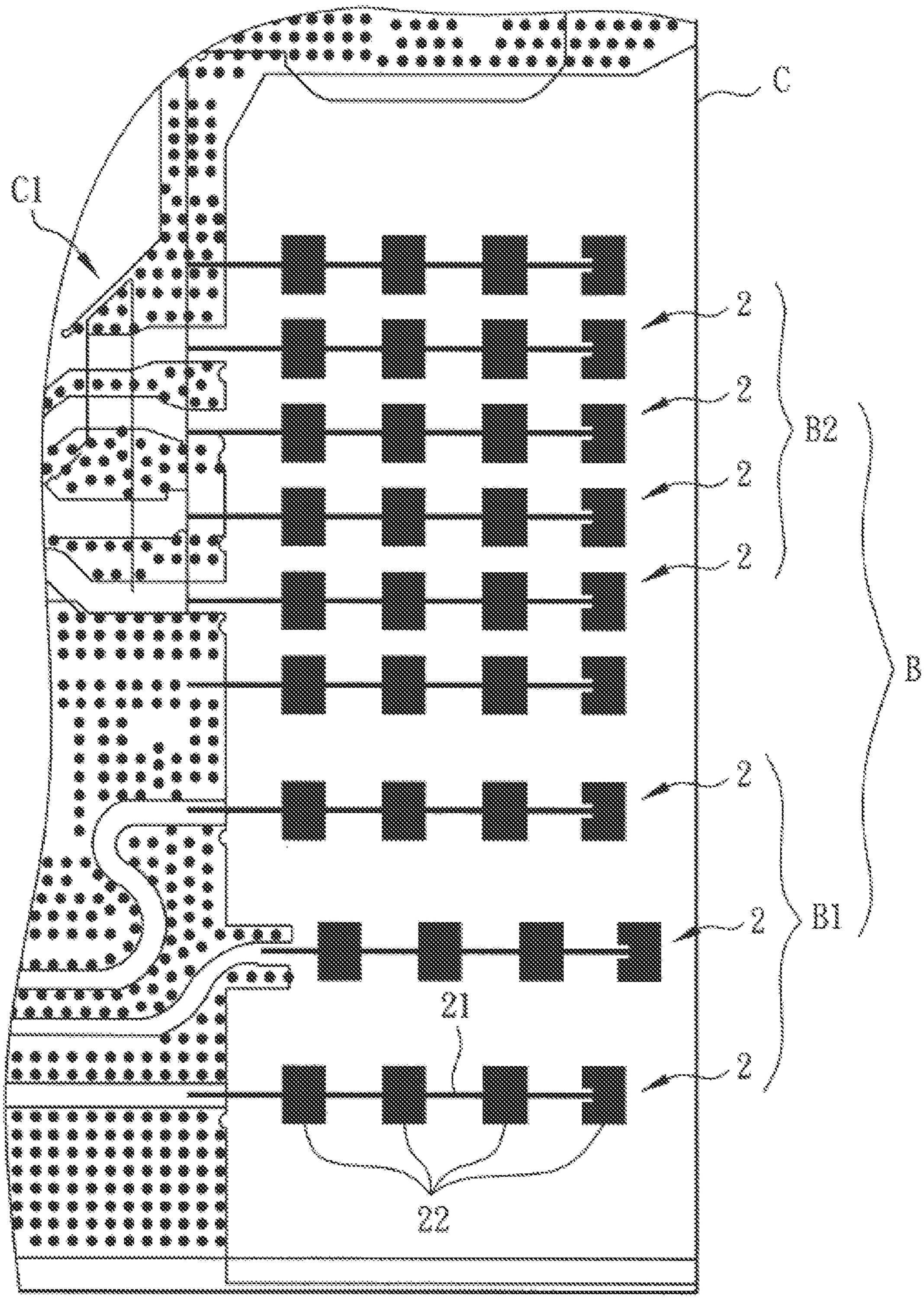
FIG. 1 (PRIOR ART)
FIG. 1 is a structural schematic diagram of an existing millimeter wave antenna.

In the drawings: 1, 10, 100 and 2, comb-shaped antenna elements

11 and 21, antenna body

111, bending part

12, 120 and 1200, micro-strip antenna radiation assemblies

121, 122 and 123, middle micro-strip antenna radiation units

124, tail-end micro-strip antenna radiation unit

1241, notch

22, micro-strip antenna radiation unit

A, A0, A00 and B, millimeter wave antennas

A1, A10, A100 and B1, emitting array antennas
A2, A20, A200 and B2, receiving array antennas
C, circuit board
C1, millimeter wave circuit
L121 and L122, length of long sides
W121 and W122, length of short sides
Y, interval distance.

DETAILED DESCRIPTION OF THE INVENTION

The specific embodiments of the present invention are further illustrated in combination with the accompanying drawings and embodiments below. The embodiments below are only used to illustrate the technical solution of the present invention more clearly, and are not intended to limit the protective scope of the present invention.

Figure 2:
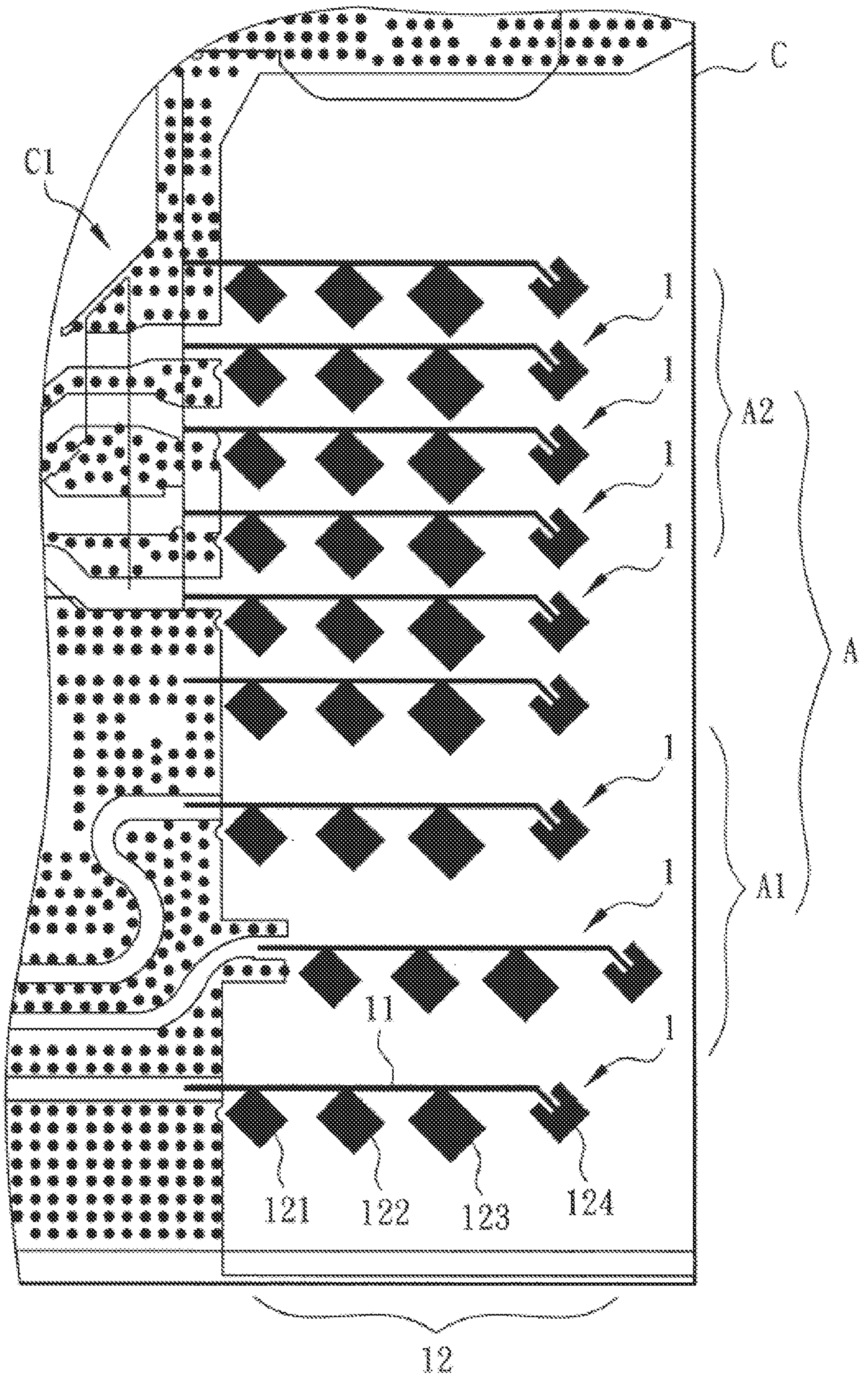
FIG. 2 is a structural schematic diagram of a structure for uniformly distributing radiation energy of a millimeter wave antenna in a first embodiment of the present invention.

As shown in FIG. 2, a structure of a millimeter wave antenna A in the embodiment 1 of the present invention includes an emitting array antenna A1 including at least one comb-shaped antenna assembly 1 and/or a receiving array antenna A2 including at least one comb-shaped antenna assembly 1, and the like. In the embodiment, the emitting array antenna A1 includes three comb-shaped antenna assemblies 1 and the receiving array antenna A2 includes four comb-shaped antenna assemblies 1. In practical application, the emitting array antenna A1 and/or the receiving array antenna A2 can respectively adjust number of the comb-shaped antenna assemblies 1 according to the needed emitting strength and receiving sensitivity of the millimeter waves. Each comb-shaped antenna assembly 1 is respectively provided with a long-strip-shaped antenna body 11 and a micro-strip antenna radiation assembly 12 arranged on the antenna body 11, one end of the antenna body 11 is connected with a millimeter wave circuit C1 on the circuit board C, and the micro-strip antenna radiation assembly 12 includes a plurality of middle micro-strip antenna radiation units 121, 122 and 123 which are sequentially arranged on the middle section of the antenna body 11 at intervals as well as a tail-end micro-strip antenna radiation unit 124 at one end of the antenna body 11 away from the millimeter wave circuit C1.

In the embodiment, the middle micro-strip antenna radiation units 121, 122 and 123 respectively have areas of different sizes; the arrangement way is that the area of the middle micro-strip antenna radiation unit 121 at one end close to the millimeter wave circuit C1 is set to be smaller, and the areas of the middle micro-strip antenna radiation units 122, 123 and the like at the other end away from the millimeter wave circuit C1 are set to be gradually increased. The shape of each of the middle micro-strip antenna radiation units 121, 122 and 123 as well as the tail-end micro-strip antenna radiation unit 124 can be a rectangle, a polygon or an ellipse and the like.

Figure 3:
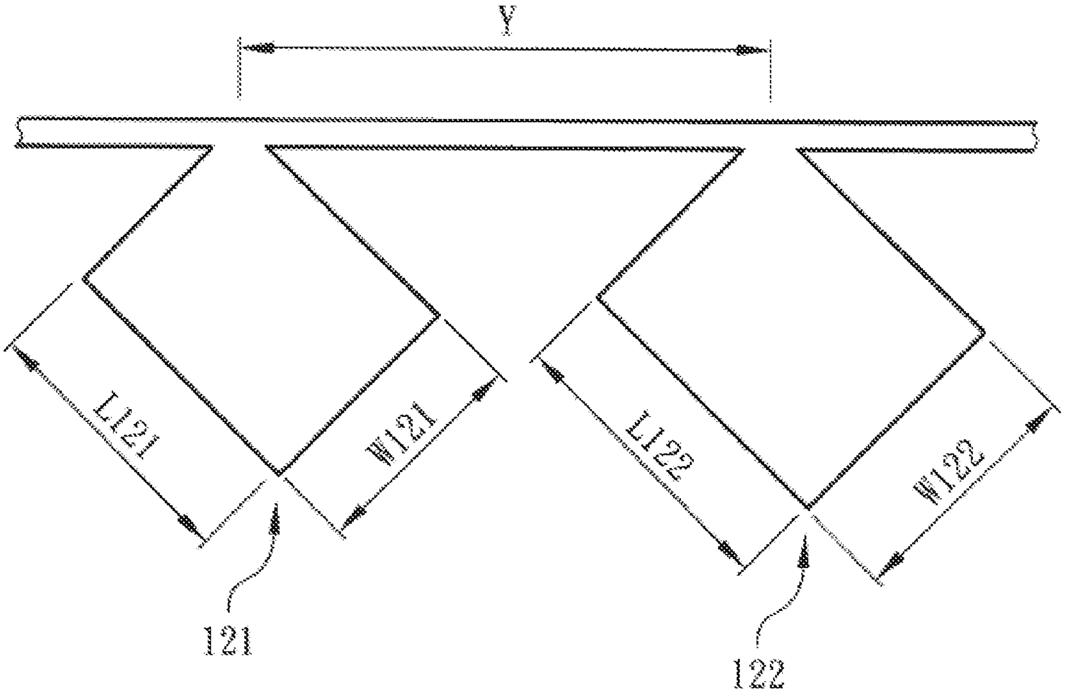
FIG. 3 is a partially enlarged schematic view of a middle micro-strip antenna unit in FIG. 2.

As shown in FIG. 3, a preferable embodiment of the comb-shaped antenna assembly 1 is disclosed. The middle micro-strip antenna radiation unit 121 is of a rectangular structure with length L121 of long sides of and length W121 of short sides. When the proportion of the length L121 of the long sides to the length W121 of the short sides is (1.2-1.3) to 1, a point of resonance of the middle micro-strip antenna radiation unit 121 is kept on a position close to 76.5 GHz. The adjacent middle micro-strip antenna radiation units 122 on one position are structures with similar rectangles and a fixed interval distance Y, the length of the long sides is L122, the length of the short sides is W122, and the proportion of the length L122 of the long sides to the length W122 of the short sides is (1.2-1.3) to 1; and meanwhile, a proportion of the area (the length L122 of the long sides*the length W122 of the short sides) of the middle micro-strip antenna radiation unit 122 to the area (the length L121 of the long sides*the length W121 of the short sides) of the middle micro-strip antenna radiation unit 121 on the original position is (1.1-1.2) to 1.

It can be known from the above that the middle micro-strip antenna radiation units 121, 122 and 123 are respectively in the shapes of rectangles with a length-to-width ratio limited within the range of (1.2-1.3) to 1, and the adjacent two middle micro-strip antenna radiation units with gradually increased areas are limited within the area proportion range of (1.1-1.2) to 1, and are provided with a fixed interval distance Y. Through the design with the areas gradually increased outwards, when the millimeter wave energy output from the millimeter wave circuit C1 is transmitted to the middle micro-strip antenna radiation unit 121 closest to the millimeter wave circuit C1 (the millimeter wave energy being the strongest and the radiation area being the smallest), the rest of the energy is continuously fed to the middle micro-strip antenna radiation unit 122 on the position along the antenna body 21 (the millimeter wave energy being weaker and the radiation area being bigger) after the middle micro-strip antenna radiation unit 121 outwards radiates one part of the energy, such that the middle micro-strip antenna radiation unit 122 on the position can utilize a greater radiation area to make up attenuation of the millimeter wave energy. In such a manner, the energy which is outwards radiated through the middle micro-strip antenna radiation unit 121 on the position can trend to the energy which is outwards radiated of the middle micro-strip antenna radiation unit 122 on the position, and the rest of the energy is continuously radiated outwards through the middle micro-strip antenna radiation unit 123 on the position. The middle micro-strip antenna radiation unit 123 on the position has a greater radiation area to make up attenuation of the millimeter wave energy again, such that radiation energy of the middle micro-strip antenna radiation units 121, 122 and 123 on the respective positions trends to be an average distribution state. In such a manner, the integral gain of the comb-shaped antenna assembly 1 is improved.

In practical application, through the design that ends of the middle micro-strip antenna radiation units 121, 122 and 123 are respectively linked to the antenna body 11 with one corner of the middle micro-strip antenna radiation units, the middle micro-strip antenna radiation units 121, 122 and 123 are arranged in the same direction at skew angles at intervals, such that opposite-direction interference is reduced. The skew angles as shown in the figure are 45 degrees.

Figure 4:
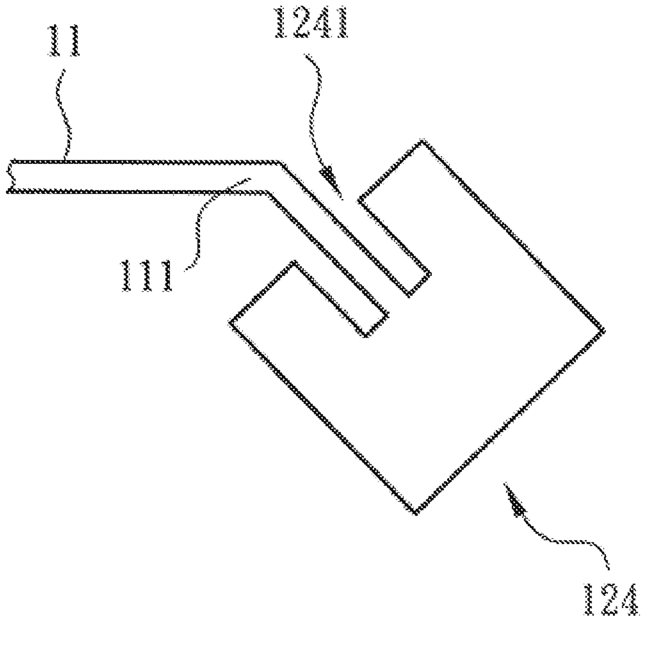
FIG. 4 is a partially enlarged schematic view of a tail-end micro-strip antenna radiation unit in FIG. 2.

As shown in FIG. 4, another preferable embodiment of the comb-shaped antenna assembly 1 is disclosed. The tail-end micro-strip antenna radiation unit 124 is in the shape of a rectangle (square), and the part connecting the tail-end micro-strip antenna radiation unit 124 to the antenna body 11 is provided with a rectangular (square) concave notch 1241. The tail end of the antenna body 11 passes through the center of the concave notch 1241 and then is connected close to the center of the tail-end micro-strip antenna radiation unit 124. Through the peripheral fed-in design of the concave notch 1241, the number of reflections of the tail-end micro-strip antenna radiation unit 124 can be reduced. As a result, when the rest of the energy after the middle micro-strip antenna radiation units 121, 122 and 123 respectively outwards radiate energy is transmitted to the tail-end micro-strip antenna radiation unit 124 through the antenna body 11, the tail-end micro-strip antenna radiation unit 124 uniformly spreads and disperses the energy outwards from the part close to the center to further improve the integral gain.

In practical application, one end of the antenna body 11 close to the tail-end micro-strip antenna radiation unit 124 is provided with a bending part 111 for bending. The tail-end micro-strip antenna radiation unit 124 can form the same skew angles with the middle micro-strip antenna radiation units 121, 122 and 123 through the bending part 111 to further reduce the opposite-direction interference.

Figure 5:
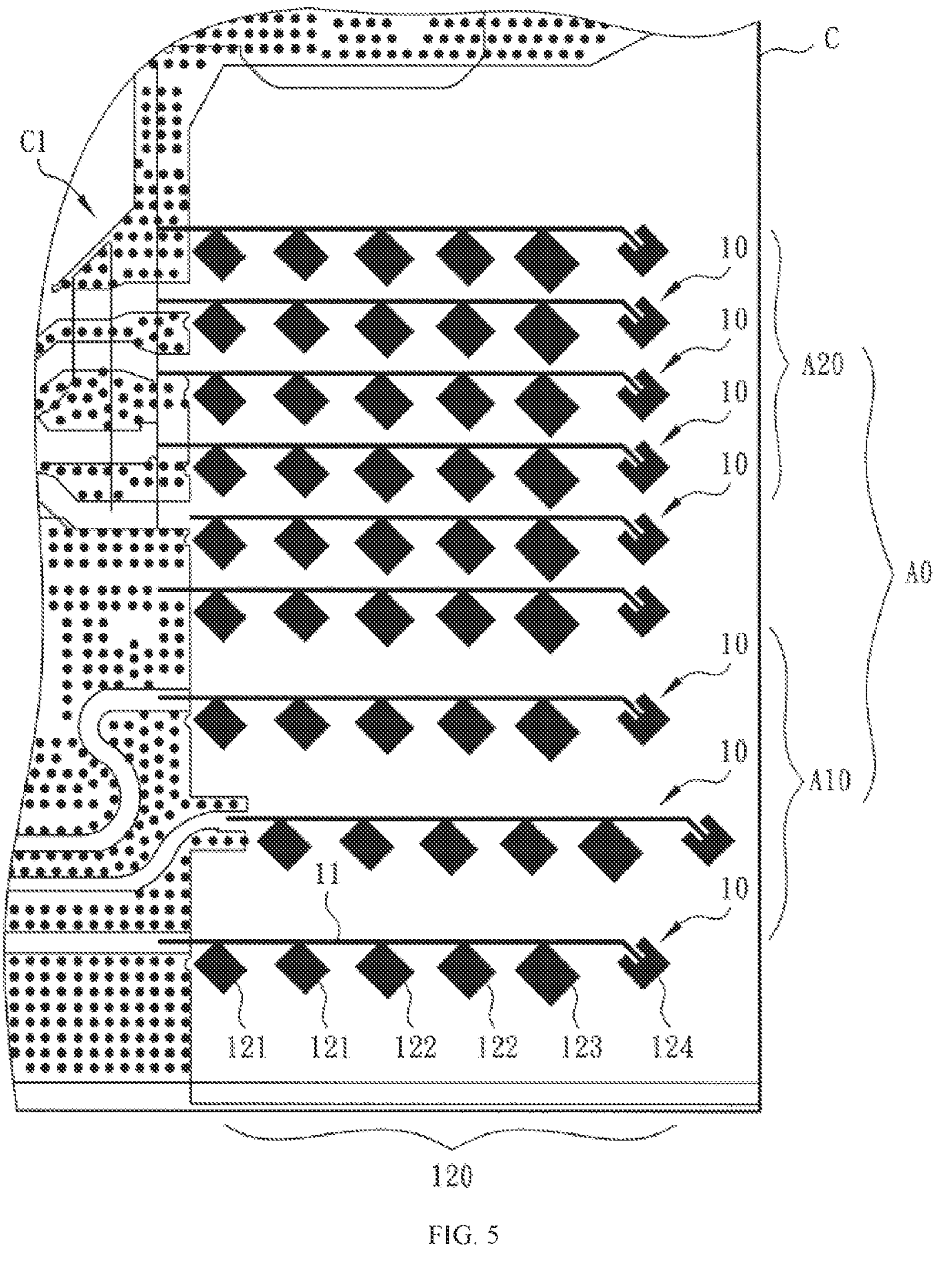
FIG. 5 is a structural schematic diagram of a structure for uniformly distributing radiation energy of a millimeter wave antenna in a second embodiment of the present invention.

As shown in FIG. 5, the structure of the millimeter wave antenna A0 in the embodiment 2 of the present invention includes an emitting array antenna A10 including at least one comb-shaped antenna assembly 10 and/or a receiving array antenna A20 including at least one comb-shaped antenna assembly 10, and the like. In the embodiment, each comb-shaped antenna assembly 10 is respectively provided with a long-strip-shaped antenna body 11 and a micro-strip antenna radiation assembly 120 arranged on the antenna body 11, and one end of the antenna body 11 is connected with a millimeter wave circuit C1 on the circuit board C. The micro-strip antenna radiation assembly 120 includes a plurality of middle micro-strip antenna radiation units 121, 122 and 123 which are sequentially arranged on the middle section of the antenna body 11 at intervals as well as a tail-end micro-strip antenna radiation unit 124 arranged at one end of the antenna body 11 away from the millimeter wave circuit C1.

Through comparison between the comb-shaped antenna assembly 10 in the second embodiment with the comb-shaped antenna assembly 1 in the first embodiment, the difference is that each of the middle micro-strip antenna radiation units 121, 122 and 123 in the micro-strip antenna radiation assembly 120 at least partially has the same area. In the embodiment as shown in FIG. 5, the micro-strip antenna radiation assembly 120 is provided with two adjacent middle micro-strip antenna radiation units 121 with same smallest area closest to the millimeter wave circuit C1, and the middle micro-strip antenna radiation unit 123 with the biggest area is located on the position of the antenna body 11 away from the millimeter wave circuit C1; and two adjacent middle micro-strip antenna radiation units 122 with the same second-large area are located between the middle micro-strip antenna radiation unit 121 with the smallest area and the middle micro-strip antenna radiation unit 123 with the biggest area of the antenna body 11. In such a manner, another comb-shaped antenna assembly 10 combined structure which meets the gradually reduced area arrangement way of the middle micro-strip antenna radiation units and has a similar function is formed.

Figure 6:
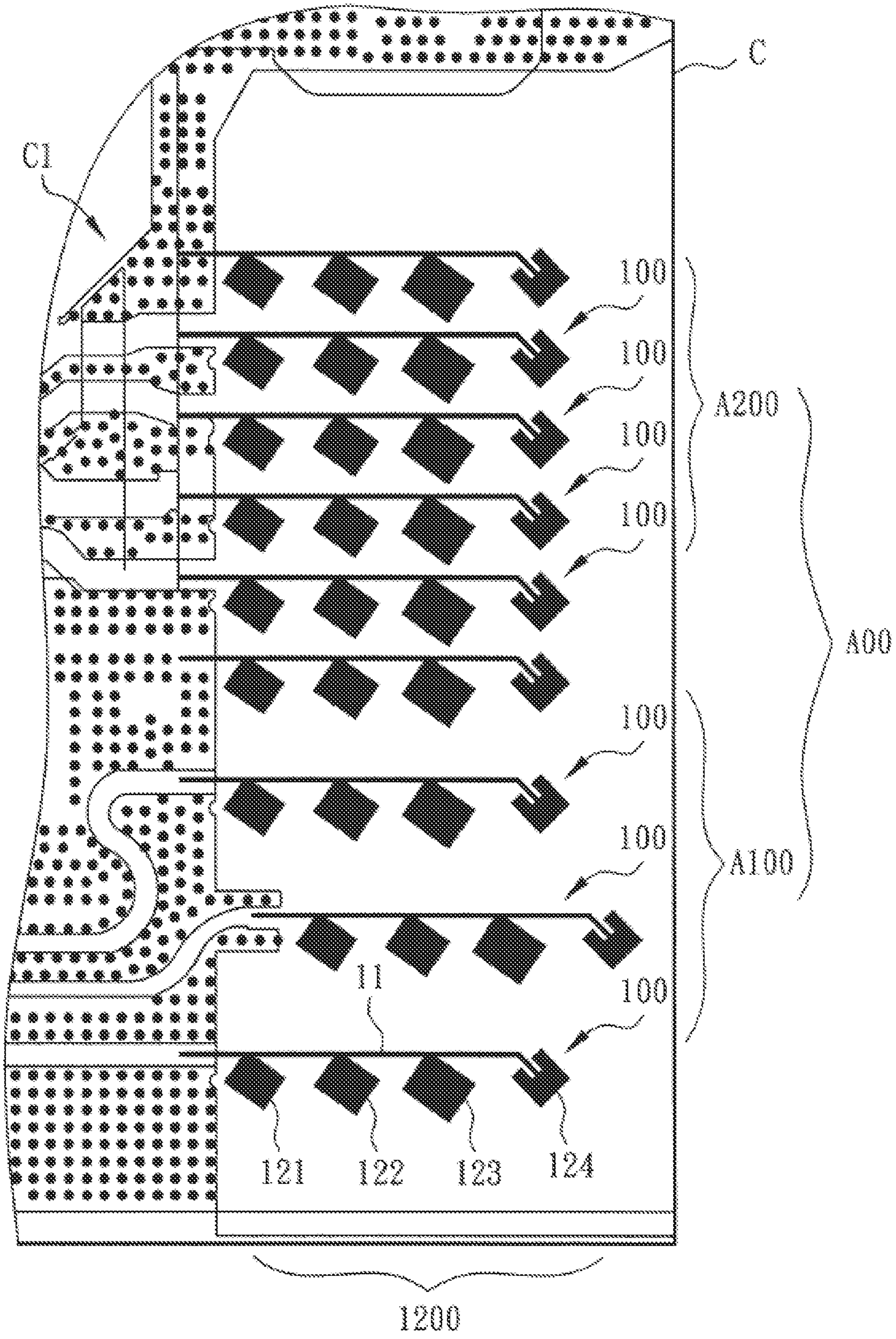
FIG. 6 is a structural schematic diagram of a structure for uniformly distributing radiation energy of a millimeter wave antenna in a third embodiment of the present invention.

As shown in FIG. 6, the structure of the millimeter wave antenna A00 in the embodiment 3 of the present invention includes an emitting array antenna A100 including at least one comb-shaped antenna assembly 100 and/or a receiving array antenna A200 including at least one comb-shaped antenna assembly 100, and the like. In the embodiment, each comb-shaped antenna assembly 100 is respectively provided with a long-strip-shaped antenna body 11 and a micro-strip antenna radiation assembly 1200 arranged on the antenna body 11, and one end of the antenna body 11 is connected with a millimeter wave circuit C1 on the circuit board C. The micro-strip antenna radiation assembly 1200 includes a plurality of middle micro-strip antenna radiation units 121, 122 and 123 which are sequentially arranged on the middle section of the antenna body 11 at intervals as well as a tail-end micro-strip antenna radiation unit 124 arranged at one end of the antenna body 11 away from the millimeter wave circuit C1.

Through comparison between the comb-shaped antenna assembly 100 in the third embodiment and the comb-shaped antenna assembly 1 in the first embodiment, the difference is that each of the middle micro-strip antenna radiation units 121, 122 and 123 of the micro-strip antenna radiation assembly 1200 and the tail-end micro-strip antenna radiation unit 124 are co-arranged on the antenna body 11 at skew angles smaller than (or greater than) 45 degrees at intervals. In such a manner, another comb-shaped antenna assembly 100 combined structure with the similar function is formed.

In conclusion, the structure for uniformly distributing the radiation energy of the millimeter wave antenna disclosed by the present invention can achieve the effects of increasing an action distance of the millimeter waves and improving anti-interference ability by improving the gain of each comb-shaped antenna assembly.

The above are only preferred embodiments of the present invention. It should be noted that, for those ordinary skilled in the art, several improvements and modifications can be made without departing from the technical principle of the present invention, and shall be regarded as the protection scope of the present invention.

The invention claimed is:

1. A structure for uniformly distributing radiation energy of a millimeter wave antenna, comprising at least one comb-shaped antenna assembly which is provided with a long-strip-shaped antenna body and a micro-strip antenna radiation assembly arranged on the antenna body, wherein:

one end of the antenna body is connected with a millimeter wave circuit capable of generating millimeter waves;

the micro-strip antenna radiation assembly includes a plurality of middle micro-strip antenna radiation units which are arranged on a middle section of the antenna body at intervals, and a tail-end micro-strip antenna radiation unit which is arranged at a tail end of the antenna body away from the millimeter wave circuit;

areas of the middle micro-strip antenna radiation units gradually increase between the end of the antenna body connected with the millimeter wave circuit and the tail end of the antenna body; and the middle micro-strip antenna radiation units are in the shape of rectangles with a length-to-width ratio of (1.2-1.3) to 1, wherein the middle micro-strip antenna radiation units include a first middle micro-strip antenna radiation unit and a second middle micro-strip antenna radiation unit adjacent to the first middle micro-strip antenna radiation unit and located closer to the tail end of the antenna body than the first middle micro-strip antenna radiation unit, and a ratio of the area of the second middle micro-strip antenna radiation unit to the area of the first middle micro-strip antenna radiation unit is in a range of (1.1-1.2) to 1.

2. The structure for uniformly distributing radiation energy of the millimeter wave antenna of claim 1, wherein at least one of the middle micro-strip antenna radiation units has the same area as an adjacent one of the middle micro-strip antenna radiation units.

3. The structure for uniformly distributing radiation energy of the millimeter wave antenna of claim 1, wherein the tail-end micro-strip antenna radiation unit is in the shape of a square.

4. The structure for uniformly distributing radiation energy of the millimeter wave antenna of claim 1, wherein a part connecting the tail-end micro-strip antenna radiation unit to the antenna body is provided with a rectangular concave notch.

5. The structure for uniformly distributing radiation energy of the millimeter wave antenna of claim 1, wherein each middle micro-strip antenna radiation unit and the tail-end micro-strip antenna radiation unit are arranged on the antenna body in the same direction at a skew angle at intervals.

6. The structure for uniformly distributing radiation energy of the millimeter wave antenna of claim 5, wherein each middle micro-strip antenna radiation unit and the tail-end micro-strip antenna radiation unit respectively form skew angles of 45 degrees with the antenna body.

7. The structure for uniformly distributing radiation energy of the millimeter wave antenna of claim 5, wherein one corner of each middle micro-strip antenna radiation unit is linked to the antenna body.

8. The structure for uniformly distributing radiation energy of the millimeter wave antenna of claim 1, wherein the middle micro-strip antenna radiation units include a plurality of pairs of the middle micro-strip antenna radiation units, each pair including a first middle micro-strip antenna radiation unit and a second middle micro-strip antenna radiation unit adjacent to the first middle micro-strip antenna radiation unit in the same pair and located closer to the tail end of the antenna body than the first middle micro-strip antenna radiation unit in the same pair, and a ratio of the area of each second middle micro-strip antenna radiation unit to the area of the first middle micro-strip antenna radiation unit in the same pair is in a range of (1.1-1.2) to 1.

9. The structure for uniformly distributing radiation energy of the millimeter wave antenna of claim 1, wherein a length of the second middle micro-strip antenna radiation unit is greater than a length of the first middle micro-strip antenna radiation unit.

10. A structure for uniformly distributing radiation energy of a millimeter wave antenna comprising at least one comb-shaped antenna assembly which is provided with a long-strip-shaped antenna body and a micro-strip antenna radiation assembly arranged on the antenna body, wherein:

one end of the antenna body is connected with a millimeter wave circuit capable of generating millimeter waves;

the micro-strip antenna radiation assembly includes a plurality of middle micro-strip antenna radiation units which are arranged on the middle section of the antenna body at intervals, and a tail-end micro-strip antenna radiation unit which is arranged at the tail end of the antenna body away from the millimeter wave circuit;

areas of the middle micro-strip antenna radiation units gradually increase between the end of the antenna body connected with the millimeter wave circuit and the tail end of the antenna body; and the middle micro-strip antenna radiation units include at least one pair of adjacent middle micro-strip antenna radiation units, each pair including a first middle micro-strip antenna radiation unit and a second middle micro-strip antenna radiation unit adjacent to the first middle micro-strip antenna radiation unit in the same pair and located closer to the tail end of the antenna body than the first middle micro-strip antenna radiation unit in the same pair, and a ratio of the area of each second middle micro-strip antenna radiation unit to the area of the first middle micro-strip antenna radiation unit in the same pair is in a range of (1.1-1.2) to 1.

11. The structure for uniformly distributing radiation energy of the millimeter wave antenna of claim 10 including a plurality of the pairs of adjacent middle micro-strip antenna radiation units.

* * * * *